N. SPJELKAVIK.
MACHINE FOR THE TREATMENT OF HERRING AND FISH.
APPLICATION FILED OCT. 16, 1919.
1,335,133.
Patented Mar. 30, 1920.
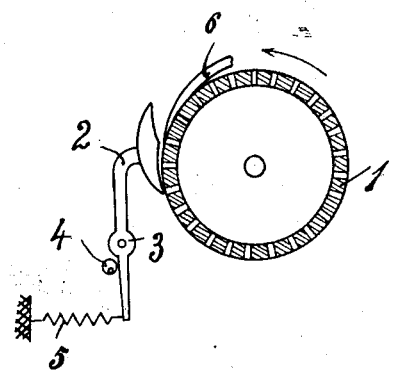
Inventor:
Nikolaj Spjelkavik
By Lawrence Langner
Attorney

UNITED STATES PATENT OFFICE.

NIKOLAI SPJELKAVIK, OF TRONDHJEM, NORWAY.

MACHINE FOR THE TREATMENT OF HERRING AND FISH.

1,335,133.  Specification of Letters Patent.  Patented Mar. 30, 1920.

Application filed October 16, 1919. Serial No. 331,157.

*To all whom it may concern:*

Be it known that I, NIKOLAI SPJELKAVIK, a subject of the King of Norway, residing at Trondhjem, Norway, have invented certain new and useful Improvements in Machines for the Treatment of Herring and Fish; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to a machine for the treatment of herring and fish, by which the herring or fish is fed ahead on a perforated support and treated by a mechanically driven hammer device, whereby the fish mush is pressed through the perforations, while the skin and bones remain on the support.

The machine preferably consists of a rotating perforated drum, on which the fish is placed and at the side of which is arranged a mechanically driven hammer device.

The latter embodiment of the invention is diagrammatically shown in the attached drawing.

1 is a perforated drum, which rotates in the direction of the arrow. 2 is a hammer pivotally supported by the stud 3 and driven by the rotating eccentric 4. The lower end of the hammer is influenced by the spring 5. The fish 6 is placed on the drum and follows the latter down toward the hammer device, where it is treated by the hammer, which oscillates with a high speed, whereby the fish mush is pressed into the drum and the skin and bones remain on the outside of the same.

Claims:

1. In a machine for the treatment of herring and other fish, a perforated body serving as a support for the fish during the treatment thereof, in combination with mechanically operated hammering means acting upon the fish so as to press the fish mush through the perforations of said body whereas skin and bones remain on the outside of the body, and means for causing said hammering means to operate repeatedly and in rapid succession.

2. In a machine for the treatment of herring and other fish, a perforated rotating drum serving as a support for the fish to be treated, in combination with mechanically operated hammering means acting repeatedly and in rapid succession upon the fish during the rotation of the drum so as to press the fish mush through the perforations of said body whereas skin and bones remain on the outside of the drum.

In testimony that I claim the foregoing as my invention I have signed my name in presence of two subscribing witnesses.

NIKOLAI SPJELKAVIK.

Witnesses:
 GEORGE SÖRENSEN,
 FANNY R. JEWETT.